United States Patent [19]

Inaba et al.

[11] 4,038,002
[45] July 26, 1977

[54] PELLETIZER

[75] Inventors: Yoshio Inaba; Takashi Hisagi, both of Tsuruga, Japan

[73] Assignee: Toyobo Co., Ltd., Japan

[21] Appl. No.: 536,183

[22] Filed: Dec. 24, 1974

[30] Foreign Application Priority Data

Dec. 24, 1973 Japan .................................. 48-3575

[51] Int. Cl.[2] .............................................. B29F 3/06
[52] U.S. Cl. .................................... 425/136; 425/145;
425/146; 425/313; 264/143
[58] Field of Search ............... 425/136, 138, 145, 146, 425/154, 153, 147, 149, 55, DIG. 230, 6, 235, 311, 313, 143; 264/40, 89, 140, 141, 142; 241/3, 34

[56] References Cited

U.S. PATENT DOCUMENTS

| 2,738,548 | 3/1956 | Kassel | 425/6 |
|---|---|---|---|
| 3,265,779 | 8/1966 | Gobla et al. | 425/6 |
| 3,436,449 | 4/1969 | Treu et al. | 264/142 |
| 3,526,926 | 9/1970 | Reid | 425/149 |
| 3,600,745 | 8/1971 | Hench | 425/66 |
| 3,689,610 | 9/1972 | Nicholson | 425/149 |
| 3,767,339 | 10/1973 | Hunkar | 425/154 |
| 3,829,263 | 7/1974 | Yao et al. | 425/147 |

*Primary Examiner*—Robert L. Spicer, Jr.
*Attorney, Agent, or Firm*—Birch, Stewart, Kolasch & Birch

[57] ABSTRACT

A vertical underwater type pelletizer-cutter apparatus utilizing a hydraulic suction force for pelletization of thermoplastic polymers comprising a nozzle portion having a plurality of nozzles through which a thermoplastic polymer in a melt state is extruded in strands, an injector portion having a plurality of injectors through which the strands are introduced with water, a cooling portion comprising a plurality of guide tubes through which the strands pass together with said water which cools and solidifies the same and a cutter portion which cuts the cooled and solidified strands into pellets, wherein means are provided for monitoring the pressure at the space in the upper part of the guide tube and for automatically stopping the extrusion of the thermoplastic polymer when the monitoring means detects an abnormal reduction in the pressure.

7 Claims, 10 Drawing Figures

PELLETIZER

BACKGROUND AND SUMMARY OF THE INVENTION

The present invention relates to a pelletizing apparatus for thermoplastic polymers. More particularly, it relates to an improvement in a vertical underwater type pelletizer-cutter apparatus utilizing a hydraulic suction force for the pelletization of thermoplastic polymers.

For pelletization of thermoplastic polymers, there have been known two processes, i.e. the one wherein a thermoplastic polymer is extruded through a nozzle in a piston type or screw type extruder, the resulting strands are cooled at a cooling zone and the cooled and solidified strands are cut by a cutter means to give pellets, and the one wherein a thermoplastic polymer is extruded through a nozzle which has the same cross-section as the desired pellet, the resulting strands are cut in pellets immediately after extrusion and while not completely solidified and the resultant pellets are cooled with air or water to perfect the solidification of the pellets.

In the former process, there is frequently used a vertical underwater type pelletizer-cutter apparatus utilizing a hydraulic suction force, which comprises a nozzle portion, an injector portion, a cooling portion and a cutter portion. Thus, a thermoplastic polymer in a melt state is extruded through a nozzle portion, and the resulting strand of the thermoplastic polymer is introduced into an injector in the injector portion and lead through a guide tube in the cooling portion where the strand is cooled and solidified with water introduced from the injector into the guide tube. The strand is combined together with the cooling water in the guide tube to the cutter portion where it is cut to produce pellets, which are discharged and then dried. In the above steps, the strand of the thermoplastic polymer in a melt state coming through the nozzle often accumulates at the entrance or top of the injector due to the swinging movement of the strand, the variation of the amount of the cooling water introduced into the injector portion, problems produced in the cutting operation and the like and, because the cooling water which is conveyed through the injector solidifies immediately, causing clogging. Once the clogging occurs, the accumulation of the polymer at one injector readily grows to adjoining injectors and ultimately covers all of the injectors so that it becomes necessary to stop the operation in order to romove the accumulated and solidified polymer. This not only necessitates the consumption of enormous labor and time but unavoidably induces deterioration of the quality of polymer being produced.

For preventing the clogging of the polymer at the injector portion, it has been the usual practice to rely on an operator's observation. In consideration of the limit of human observation ability and the savings in labor, it is more desirable to automatically detect the clogging of the injector at the very beginning of the operation, thereby eliminating such problems at an early stage.

As a result of an extensive study, it has now been found that normally the upper portion of the guide tube does not fully fill with water, and thus when the clogging begins to start at the injector, the pressure in the said space is reduced. The pressure reduction reaches its maximum several seconds after the clogging up of the injector gradually reaches a certain constant level with the lapse of time. The time in which the maximum reduced pressure is reached is usually from about 3 to 6 seconds, although it may be varied with the amount and temperature of the cooling water, the type of injector, etc.

Based on the above finding, the present invention provides a vertical underwater type pelletizer-cutter apparatus utilizing a hydraulic suction force for the pelletization of thermoplastic polymers comprising a nozzle portion having a plurality of nozzles through which a thermoplastic polymer in a melt state is extruded in strands, an injector portion having a plurality of injectors through which the strands are introduced together with water, a cooling portion having a plurality of guide tubes through which the strands are conveyed together with said water to cool and solidify the polymer and a cutter portion where the cooled and solidified strands are cut into pelets, wherein means are provided for monitering the pressure of the space in the upper portion of the guide tube and for automatically stopping the extrusion of the thermoplastic polymer when the monitering means detects an abnormal reduction in the pressure.

In the apparatus of the present invention, there is no particular restriction on the monitering means. Since, however, the degree of the pressure reduction resulting from the clogging of the injector portion is not very high, it is preferably to use a device which is capable of sensitively detecting even a minute pressure variation. As such device, there may be used one which can measure the pressure due to a difference in liquid levels, e.g. a monometer; one which can measure a pressure due to elasticity deformation of a membrane caused by pressure difference e.g. Bourdon tube vacuum gauge, diaphragm type vacuum gauge, bellows type vacuum gauge and the like. The connection of the device with the guide tube may be accomplished by the use of a fine tube, preferably at the upper portion of the guide tube.

There is also no particular limitation on the automatic control means for stopping the extrusion of the thermoplastic polymer upon an detection of the abnormal pressure reduction by the monitering means. For stopping the extrusion, a cock valve, or the like is usually employed. In the apparatus of the present invention, the use of an automatic valve utilizing air, electricity, oil or the like (e.g. diaphram type regulating valve, electric valve) is desirable.

The connection of the monitering means with the automatic control means may be achieved by any conventional manner. For instance, an electric circuit, a compressed air duct or their combination may be adopted. Preferably, the monitering means on one injector may be connected with the automatic control means on the extrusion portion or nozzle corresponding to the said injector. However, one monitering means is not always required to be connected with one automatic control means and thus it may be connected with two or more automatic control means.

BRIEF DESCRIPTION OF THE DRAWINGS

The apparatus of the present invention will be hereinafter illustrated more in details making reference to the accompanying drawings wherein:

In FIG. 1, 1 is the nozzle portion having a plurality of nozzles, which are usually heated. In the embodiment as shown, the nozzles are provided at the circumference. In the injector portion 2, there are provided a plurality of funnel-shaped injector metal fittings (i.e. injectors) at positions corresponding to the nozzles, and inlet means 3 indicating the inlet for cooling water. Under the injector portion 2, there are arranged a plurality of guide tubes 4, which constitute the cooling, at the positions corresponding to the injectors. The lower portions of the guide tubes 4 are connected to the cutter portions 5 having a discharge outlet 6.

Figure 1:
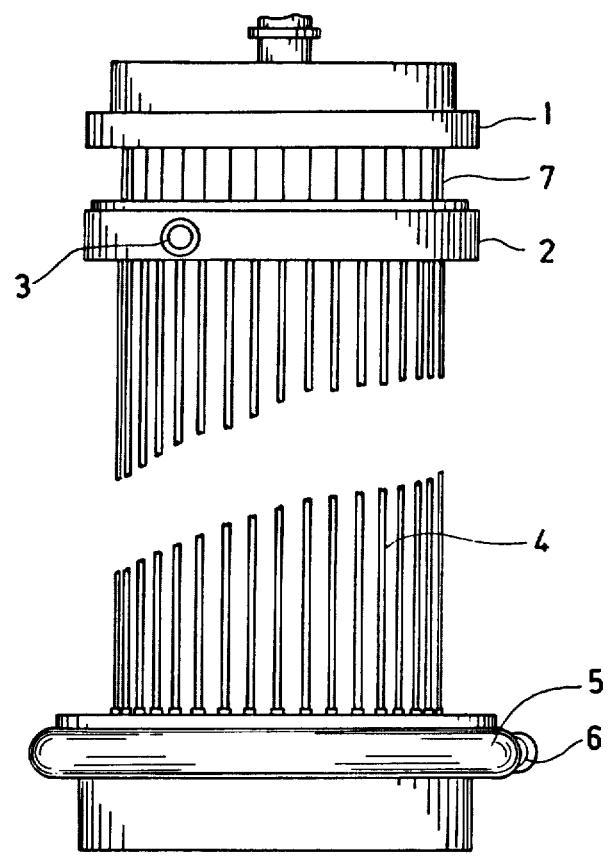
FIG. 1 is a front elevational view of a conventional vertical underwater type pelletizer-cutter apparatus.

A thermoplastic polymer in a melt state is extruded through the nozzle part 1 to make strands 7, each of which is introduced through each injector of the injector portion 2 into each guide tube 4 at the cooling portion. Cooling water is introduced from the inlet 3 into the injector portion 2 and then lead into the guide tubes 4. The strands and the water pass together through the guide tubes 4, during which the strands are cooled and solidified. The strands which are introduced into the cutter portion 5 are cut into pellets by the cutter provided therein, and the pellest are discharged together with the water through the outlet 6.

Figure 2:
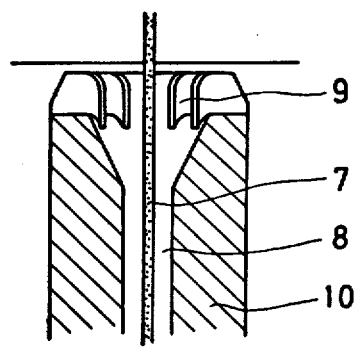
FIG. 2 is an enlarged cross-sectional view of an injector in the injector portion of the apparatus in a non-clogging state.
Figure 3:
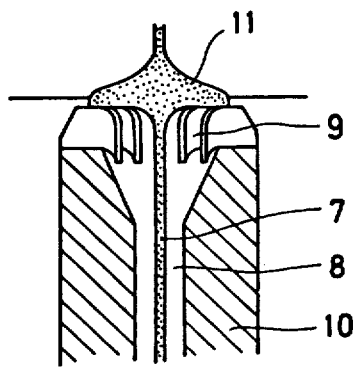
FIG. 3 is an enlarged cross-sectional view of an injector in a clogging state.

In FIGS. 2 and 3, element 7 is the strand of thermoplastic polymer, element 8 is the passageway for accommodating the strand and the cooling water, element 9 is a guide fin, element 10 is the holder portion and element 11 is the accumulated thermoplastic polymer.

The strand 7 comes from the nozzle of the extruder and is introduced into the injector where it is brought into contact with the water, which flows in together with air through the guide fins 9, and lead through the guide tube by the suction force of the water. Under a normal operating situation, the strand runs smoothly through the injector as shown in FIG. 2. If, however, the accumulation of the thermoplastic polymer in the strand starts to occur on the guide fin 9 at the injector due to a swinging movement of the strand, a variation in the amount of a cooling water, and problems in the cutting operation, or the like as shown in FIG. 3, the accumulated polymer 11 immediately solidifies because of the contact made with the cooling water and eventually clogs up the adjoining injector and ultimately all of the injectors.

Figure 4:
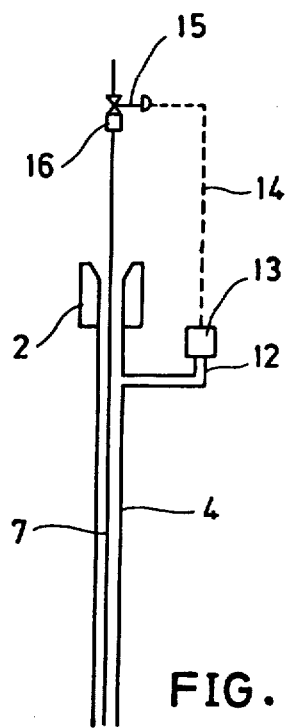
FIG. 4 is a partial schematic diagram showing a typical example of a monitering means and an automatic control means utilized in the apparatus according to the present invention.

In FIG. 4, element 2 is the injector part, element 4 is the guide tube, element 7 is the strand, element 12 is a fine tube, element 13 is a vacuum pressure switch, element 14 is an electrical circuit, element 15 is a diaphragm valve or a cock valve and element 16 is the nozzle. Thus, the vacuum pressure switch 13 is provided on the guide tube 4 intervening the fine tube 12. When any accumulation starts to occur at the injector 2, the pressure reduction in the space of the guide tube 4 caused thereby is detected by the vacuum pressure switch 13, and a resulting signal is transferred through the electrical circuit 14 to the diaphragm or cock valve 15 which controls the flow passage of the molten thermoplastic polymer, whereby the diaphragm valve 15 is closed to stop the introduction of the molten thermoplastic polymer in strand through the nozzle 16.

Figure 5:
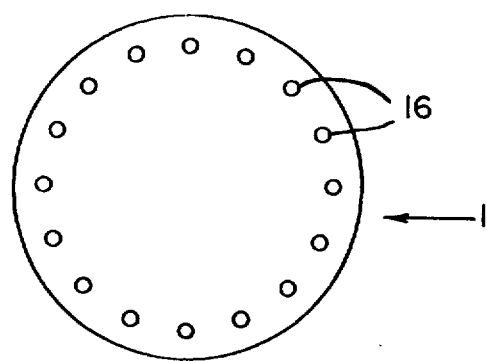
FIG. 5 is a vertical cross-sectional view of the nozzles.

FIG. 5, attached to the present Amendment, is a vertical cross-sectional view of the nozzle 16, said nozzle being provided with a cock valve 15 for controlling the extrusion of the thermoplastic polymer in the melt state from the nozzle. A cock valve 15 may be opened or closed by utilizing a lever 17.

Figure 6:
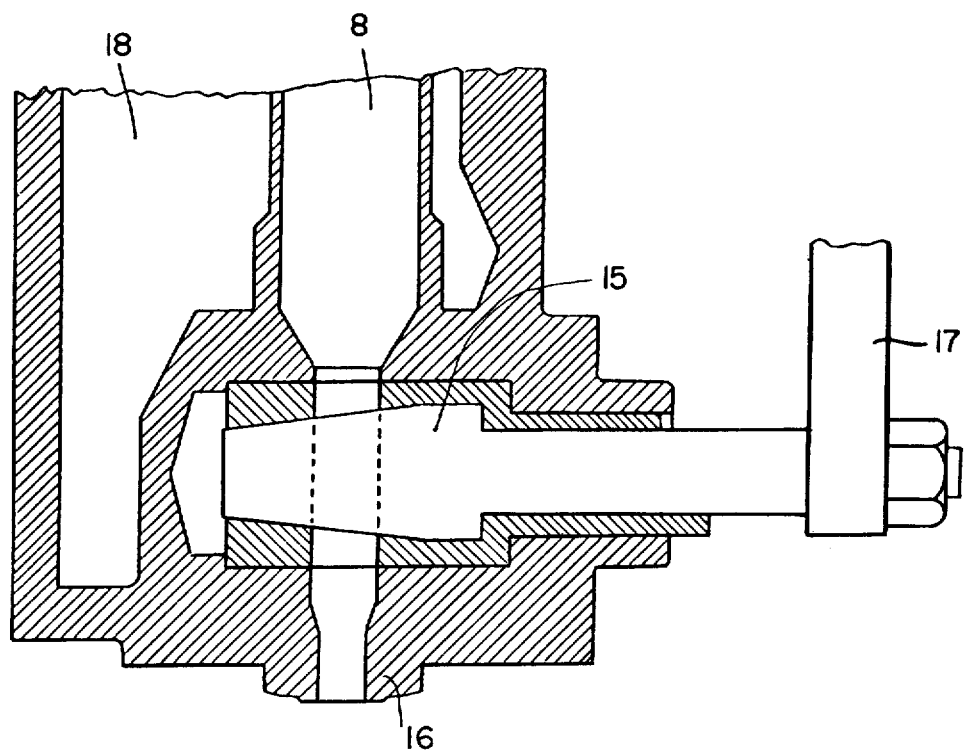
FIG. 6 shows the operation of the cock valve.

In FIG. 6, the thermoplastic polymer in the melt state is filled within a pipe 8, and then the polymer is extruded through the nozzle by rotating the cock valve 15 by actuating the lever 17. A chamber 18 is disposed adjacent the pipe 8, said chamber being filled with a dowtherm vapor which functions as a heating means for the pipe.

Up to the present time, the opening and closing of the cock valve has been carried out by hand by a worker whose job it is to close the cock valve when the injector means becomes clogged by the accumulated polymer. According to the present invention, the opening and closing of the cock valve can be carried out automatically.

Figure 7A:
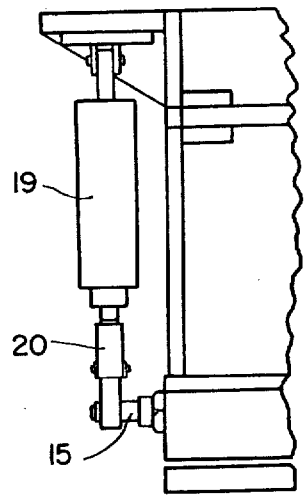
FIGS 7A and 7B show the automatic open and close device for the cock valve.
Figure 7B:
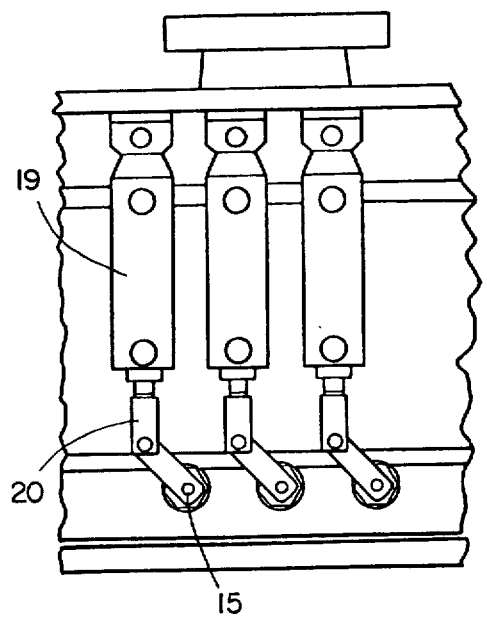

FIGS. 7A and 7B show an automatic open and close device for the cock valve, wherein air cylinders 19 are utilized for automatically opening and closing the nozzles. FIG. 7A is a front elevational view of said device and FIG. 7B is a side view of said device. In FIGS. 7A and 7B, the nozzles are disposed in a circular array in the nozzle portion of the apparatus. When the clogging of the polymer at the injector element 2 is detected by means of the pressure switch 13, a signal is provided to the air cylinders and the cock valve is closed utilizing the link mechanism 20 shown in FIG 7A. Of course, it is readily apparent that the cock valve may be replaced with a diaphragm-type regulating valve as suggested hereinabove.

Figure 8:
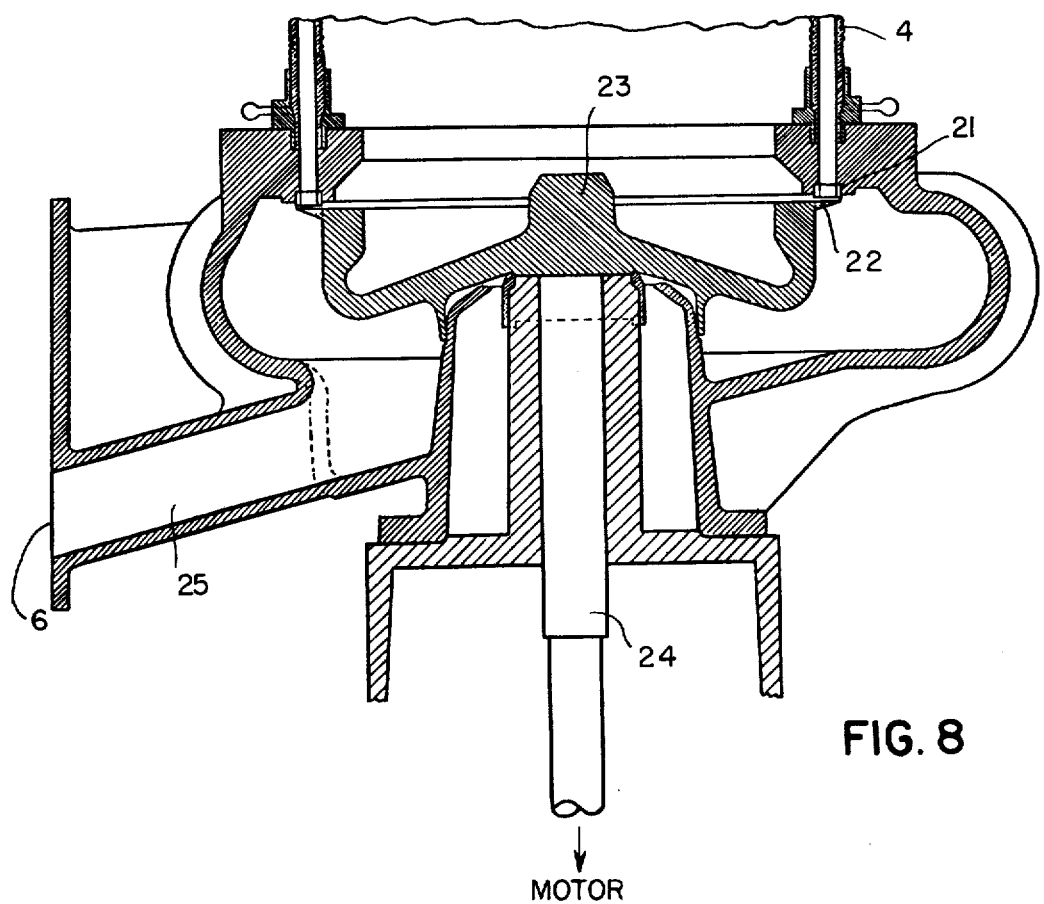
FIG. 8 shows a typical cutter element.

FIG. 8 is a vertical cross-sectional view of a typical cutter element which can be utilized in the present invention. Guide tubes 4 are annularly disposed over the circumference of the cutter element 5. The cutter comprises a plurality of circular, stationary blades 21 and a plurality of revolving blades 22. The stationary blades are each mounted on the circumference of the housing of the cutter element 5 just below the guide tube. The revolving blades are each mounted on the outside of the circumference of the generally circular disk 23 and are annularly disposed so as to locate the revolving blades just below the stationary blades. The disk is rotatably mounted within the housing of the cutter element 5 and is connected with a motor via a shaft 24. The revolving blades are rotated about the shaft by means of the motor. The strands which are conveyed together with the cooling water through guide tubes 4 enters the housing of the cutter element 5 wherein they are cut into pellets by means of said blades. The pellets are discharged, together with the water, through the exhaust passage 25 and the outlet 6.

Figure 9:
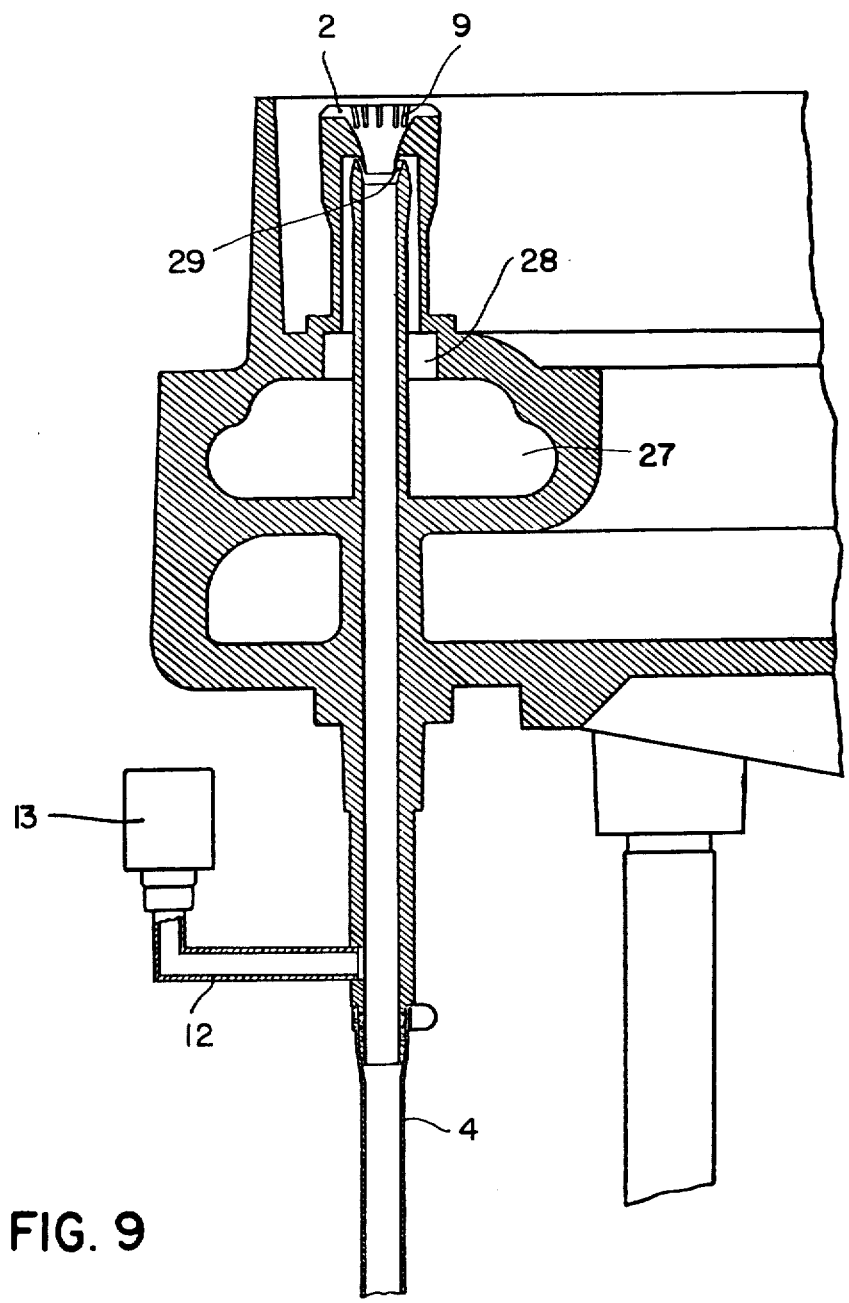
FIG. 9 shows, in greater detail, the operation of the injector.

The hydraulic suction force is produced by the pressure of the water in addition to the pressure of falling water. In FIG. 9, pressure water is introduced into a chamber 27 and passes through the space 28 in the guide tube. The fresh water is then jetted in the downward direction in the guide tube from an aperture 29 which is formed annularly and directed downward in the interior of the guide tube. Utilizing water pressure produces a greater hydraulic suction force than merely utilizing falling water only.

In the apparatus of the present invention, the time required for detection of the abnormal accumulation of the thermoplastic polymer at the injector part (2) is extremely short so that the introduction of the molten polymer is stopped while the accumulation is still very small. Hence, the removal of the accumulated polymer can be made with great ease. This permits a quick restart of the operation for pelletization, which results in a decrease in the loss of the polymer. In addition, it also results in an increase in the quality period where the polymer, since the time of the polymer stays in the melt state is shortened.

Further, the apparatus of the present invention makes it possible to detect operation abnormality at the injector without requiring human observation, whereby labor cost is drastically reduced.

Moreover, the apparatus of the invention can be obtained by providing a conventional vertical underwater type pelletizer-cutter apparatus with a simple device comprising a monitering means and an automatic control means, and this feature is quite meritorious with respect to apparatus cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A substantially vertically disposed pelletizer apparatus utilizing a hydraulic suction force for the pelletization of a thermoplastic polymer which comprises a plurality of nozzle means for extruding a thermoplastic polylmer in a melt state into strands, a plurality of injector means disposed below corresponding nozzle means, said injector means receiving the strands from the nozzle means, and provided with means for introducing water and air together with said strands, a plurality of guide tubes disposed below corresponding injector means, said guide tubes defining a space therein for receiving said strands and water-air mixture, said water cooling and solidifying the strands during their travel through said guide tubes, a cutter means disposed below the guide tubes for cutting the cooled and solidified strands, and an automatic control system for controlling the amount of thermoplastic polymer extruded through the nozzle means, said automatic control system including means for sensing the air pressure of the space in the upper portion of the guide tubes and control means connected to said sensing means for controlling the extrusion of the thermoplastic polymer through the nozzle, said control means being responsive to the operation of the sensing means.

2. The apparatus of claim 1, wherein heating means are associated with the nozzle means.

3. The apparatus of claim 1, wherein the nozzle means are disposed in a circular array.

4. The apparatus of claim 1, wherein the means for introducing water and air into the injector means comprises guide fins.

5. The apparatus of claim 1, wherein the control means of the automatic control system is a valve means which is connected to the sensing means by an electrical circuit.

6. The apparatus of claim 5, wherein the sensing means includes a tube provided with a vacuum pressure switch, said tube communicating with the guide tube.

7. The apparatus of claim 6, wherein the sensing means detects a pressure change in the guide tube produced by an abnormal accumulation of the thermoplastic polymer at the injector means.

* * * * *